(12) United States Patent
Menchetti et al.

(10) Patent No.: US 12,057,885 B2
(45) Date of Patent: Aug. 6, 2024

(54) OPTICAL NETWORK

(71) Applicant: BRITISH TELECOMMUNICATIONS PUBLIC LIMITED COMPANY, London (GB)

(72) Inventors: Marco Menchetti, London (GB); Daniel Gilks, London (GB); Fraser Ashley Burton, London (GB); Liam William Bussey, London (GB)

(73) Assignee: BRITISH TELECOMMUNICATIONS PUBLIC LIMITED COMPANY (GB)

( * ) Notice: Subject to any disclaimer, the term of this patent is extended or adjusted under 35 U.S.C. 154(b) by 0 days.

(21) Appl. No.: 18/495,652

(22) Filed: Oct. 26, 2023

(65) Prior Publication Data

US 2024/0171281 A1 May 23, 2024

(30) Foreign Application Priority Data

Nov. 18, 2022 (EP) .................................... 22208393

(51) Int. Cl.
*H04B 10/00* (2013.01)
*H04B 10/2507* (2013.01)
*H04B 10/27* (2013.01)
*H04J 14/00* (2006.01)

(52) U.S. Cl.
CPC ......... *H04B 10/27* (2013.01); *H04B 10/2507* (2013.01)

(58) Field of Classification Search
CPC ........................ H04B 10/615; H04B 10/616; H04B 10/6165; H04B 10/67; H04B 10/671
See application file for complete search history.

(56) References Cited

U.S. PATENT DOCUMENTS

| | | | | |
|---|---|---|---|---|
| 11,349,573 | B1* | 5/2022 | Campos | ............... H04B 10/501 |
| 11,418,312 | B2* | 8/2022 | Sun | ........................ H04B 10/63 |
| 2016/0211917 | A1 | 7/2016 | Kowalevicz | |
| 2016/0301475 | A1 | 10/2016 | Li et al. | |
| 2022/0263584 | A1 | 8/2022 | Hu et al. | |

FOREIGN PATENT DOCUMENTS

| | | |
|---|---|---|
| CN | 207588866 U | 7/2018 |
| CN | 106656334 B | 6/2023 |
| EP | 3687085 A1 | 7/2020 |

OTHER PUBLICATIONS

Extended European Search Report received for European Patent Application No. 22208393.3, mailed on May 11, 2023, 5 pages.

(Continued)

*Primary Examiner* — Daniel G Dobson
(74) *Attorney, Agent, or Firm* — Pranger Law PC

(57) ABSTRACT

This disclosure provides an optical network, and a method in an optical network, wherein: each reference optical transmitter is configured to transmit a reference optical signal on an associated second optical fiber of a plurality of second optical fibers, each reference error signal generator is configured to generate a reference error signal based on a reflection of the reference optical signal on the associated second optical fiber of the plurality of second optical fibers, and each reference phase shifter is configured to apply a phase shift to the first optical signal based on the reference error signal.

10 Claims, 8 Drawing Sheets

(56) References Cited

OTHER PUBLICATIONS

Search Report received for Great Britain Application No. 2217314.0, mailed on May 22, 2023, 4 pages.
Clivati et al., "Coherent Phase Transfer for Real-World Twin-Field Quantum Key Distribution", Nature Communications, vol. 13, No. 157, 2022, pp. 1-9.
Fang et al., "Phase Noise Estimation and Suppression for PDM CO-OFDM/OQAM Systems", Journal of Lightwave Technology, vol. 35, No. 10, May 15, 2017, pp. 1837-1846.
Kim et al., "Performance Analysis of Phase Noise Cancellation by Asymmetric CMA for Realizing Affordable Coherent PON Transceivers", Journal of Lightwave Technology, vol. 38, No. 8, Apr. 15, 2020, pp. 2231-2241.
Narbonneau et al., "High Resolution Frequency Standard Dissemination via Optical Fiber Metropolitan Network", Review of Scientific Instruments, Available Online at <https://arxiv.org/abs/physics/0603125>, Mar. 15, 2006, pp. 1-8.
Wong et al., "Directly Modulated Self-Seeding Reflective Semiconductor Optical Amplifiers as Colorless Transmitters in Wavelength Division Multiplexed Passive Optical Networks", Journal of Lightwave Technology, vol. 25, No. 1, Jan. 2007, pp. 67-74.
Xu et al., "Studying Fundamental Limit of Optical Fiber Links to 10-21 Level", Optics Express, vol. 26, May 28, 2018, pp. 9515-9527.

\* cited by examiner transmitting a reference optical signal on the associated second optical fibre of the plurality of second optical fibres (S301)

generating a reference error signal based on a reflection of the reference optical signal on the associated second optical fibre of the plurality of second optical fibres (S303)

applying a phase shift to the first optical signal based on the reference error signal (S305)

Figure 8

OPTICAL NETWORK

PRIORITY CLAIM

The present application claims priority from European Patent 22208393.3, filed Nov. 18, 2022, which is hereby fully incorporated herein by reference.

TECHNICAL FIELD

The present disclosure relates to an optical network.

BACKGROUND

A conventional optical network architecture comprises a single Optical Line Termination (OLT) and a plurality of Optical Network Units (ONUs) connected in a one-to-many relationship via an optical splitter (and optionally an aggregation node). The OLT comprises an optical source for generating an optical signal that is distributed to each ONU via the optical splitter. One or more ONUs may have specific requirements for one or more properties of the optical signal, such as a linewidth and/or signal coherence time requirement. A property of the optical signal at the ONU is a function of the property of the optical signal as generated by the OLT and any changes experienced by the optical signal as it is communicated via the optical components to the ONU (e.g. the optical splitter and the connecting optical fibers between the OLT, optical splitter and ONU). These changes in properties may be realized in linewidth broadening and/or a reduction in signal coherence time.

SUMMARY

According to a first aspect of the disclosure, there is provided an optical network comprising: a first optical transmitter; an optical splitter; a plurality of optical receivers; a first optical fiber connecting the first optical transmitter and the optical splitter; a plurality of second optical fibers, each second optical fiber connecting the optical splitter to a respective optical receiver of the plurality of optical receivers, wherein the first optical transmitter is configured to transmit a first optical signal to each optical receiver of the plurality of optical receivers via the first optical fiber, the optical splitter and a respective second optical fiber of the plurality of second optical fibers; and a plurality of second optical fiber phase correction units, each second optical fiber phase correction unit being associated with a second optical fiber of the plurality of second optical fibers, each second optical fiber phase correction unit comprising a reference optical transmitter, a reference error signal generator and a reference phase shifter, wherein: each reference optical transmitter is configured to transmit a reference optical signal on the associated second optical fiber of the plurality of second optical fibers, each reference error signal generator is configured to generate a reference error signal based on a reflection of the reference optical signal on the associated second optical fiber of the plurality of second optical fibers, and each reference phase shifter is configured to apply a phase shift to the first optical signal based on the reference error signal.

Each optical receiver of the plurality of optical receivers may comprise the associated second optical fiber phase correction unit of the plurality of second optical fiber phase correction units.

The reference optical signal may be reflected by the optical splitter so as to generate the reflection of the reference optical signal.

The first optical signal may be transmitted in a downstream direction and the reference optical signal may be transmitted in an upstream direction.

The optical network may further comprise: a first optical fiber phase correction unit associated with the first optical fiber, the first optical fiber phase correction unit comprising a first error signal generator and a first phase shifter, wherein: the first error signal generator is configured to generate a first error signal based on a reflection of the first optical signal on the first optical fiber, and the first phase shifter is configured to apply a phase shift to the first optical signal based on the first error signal.

The first optical transmitter may be configured to transmit the first optical signal at a first wavelength to each optical receiver of the plurality of optical receivers via the first optical fiber, the optical splitter and the respective second optical fiber of the plurality of second optical fibers, and the reference optical transmitter may be configured to transmit the reference optical signal at a second wavelength on the associated second optical fiber of the plurality of second optical fibers, wherein the first wavelength is different to the second wavelength.

The optical splitter may be a first hop optical splitter of a plurality of optical splitters, the plurality of optical splitters may further comprise a first last-hop optical splitter and a second last-hop optical splitter, a first set of the plurality of optical receivers may be connected to the first last-hop optical splitter, a second set of the plurality of optical receivers may be connected to the second last-hop optical splitter, the first optical signal may comprise data for the first set of the plurality of optical receivers and may be transmitted at a first wavelength using wavelength-division-multiplexing via the first-hop optical splitter and the first last-hop optical splitter, and the first optical transmitter may be further configured to transmit a second optical signal at a second wavelength using wavelength-division-multiplexing via the first-hop optical splitter and the second last-hop optical splitter, the second optical signal comprising data for the second set of the plurality of optical receivers, and the optical network may further comprise: a first wavelength-selective reflector associated with the first last-hop optical splitter and configured to reflect the first optical signal at the first wavelength; a second wavelength-selective reflector associated with the second last-hop optical splitter and configured to reflect the second optical signal at the second wavelength; and a first optical fiber phase correction unit associated with the first optical fiber, the first optical fiber phase correction unit comprising a first error signal generator, a first phase shifter, a second error signal generator and a second phase shifter, wherein: the first error signal generator is configured to generate a first error signal based on a reflection of the first optical signal at the first wavelength on the first optical fiber, the first phase shifter is configured to apply a phase shift to the first optical signal at the first wavelength based on the first error signal, the second error signal generator is configured to generate a second error signal based on a reflection of the second optical signal at the second wavelength on the first optical fiber, and the second phase shifter is configured to apply a phase shift to the second optical signal at the second wavelength based on the second error signal.

According to a second aspect of the disclosure, there is provided a method in an optical network, the optical network comprising: a first optical transmitter; an optical splitter; a plurality of optical receivers; a first optical fiber connecting the first optical transmitter and the optical splitter; a plurality of second optical fibers, each second optical fiber connecting the optical splitter to a respective optical receiver of the plurality of optical receivers, wherein the first optical transmitter is configured to transmit a first optical signal to each optical receiver of the plurality of optical receivers via the first optical fiber, the optical splitter and a respective second optical fiber of the plurality of second optical fibers; and a plurality of second optical fiber phase correction units, each second optical fiber phase correction unit being associated with a second optical fiber of the plurality of second optical fibers, the method comprising: transmitting a reference optical signal on the associated second optical fiber of the plurality of second optical fibers; generating a reference error signal based on a reflection of the reference optical signal on the associated second optical fiber of the plurality of second optical fibers; and applying a phase shift to the first optical signal based on the reference error signal.

According to a third aspect of the disclosure, there is provided a computer program comprising instructions which, when the program is executed by a computer, cause the computer to carry out the method of the second aspect of the disclosure. The computer program may be stored on a computer readable carrier medium.

BRIEF DESCRIPTION OF THE FIGURES

In order that the present disclosure may be better understood, embodiments thereof will now be described, by way of example only, with reference to the accompanying drawings in which:

FIG. 8 is a flow diagram illustrating a third method.

DETAILED DESCRIPTION

Figure 1:
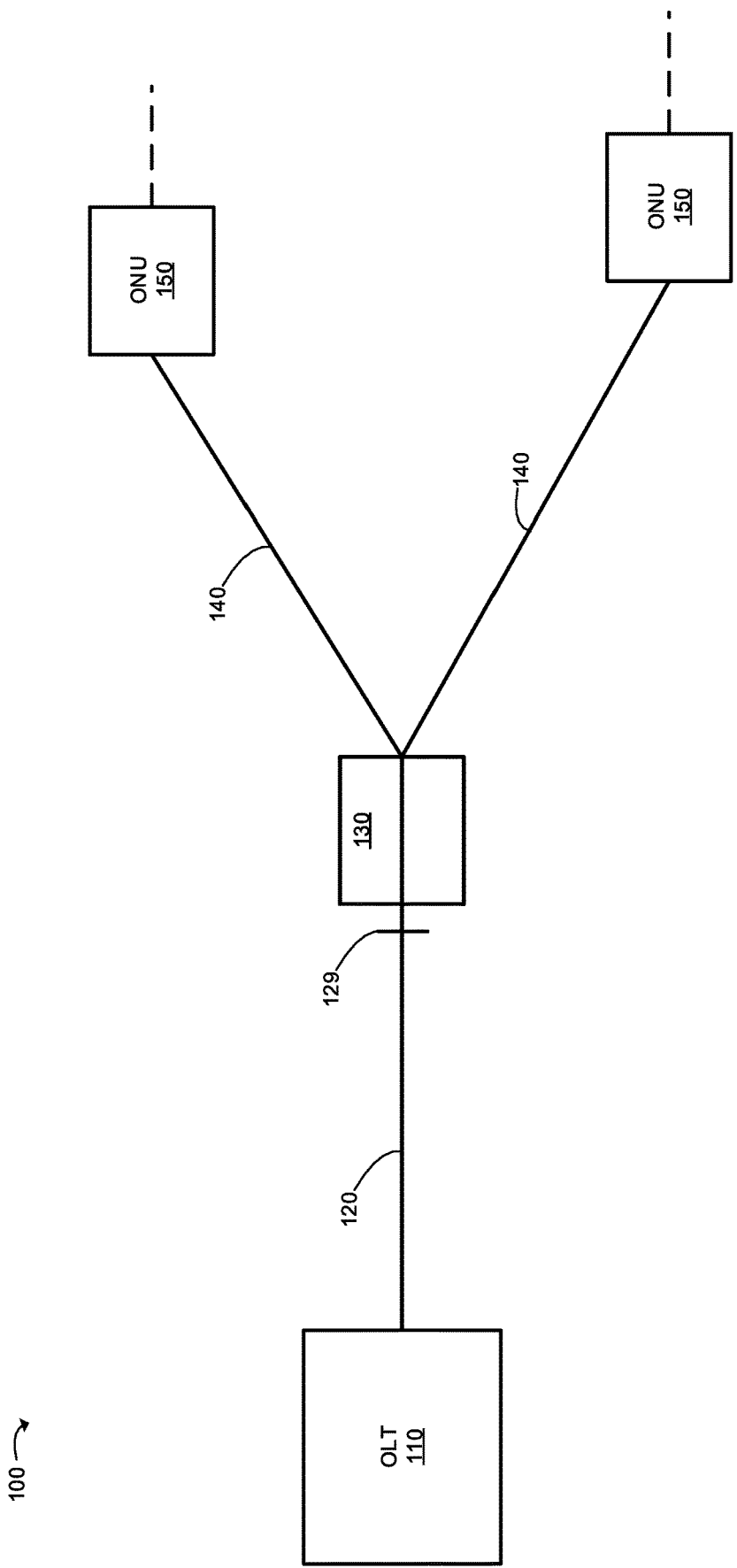
FIG. 1 is a schematic diagram illustrating a first optical network.

FIG. 1 illustrates a first optical network 100 comprising an Optical Line Termination (OLT) 110, an optical splitter 130, and a plurality of Optical Network Units (ONUs) 150. The OLT 110 and optical splitter 130 are connected by a first optical fiber known as a spine fiber 120. The optical splitter 130 is connected to each ONU 150 of the plurality of ONUs 150 by a respective second optical fiber known as a distribution fiber 140.

Figure 2:
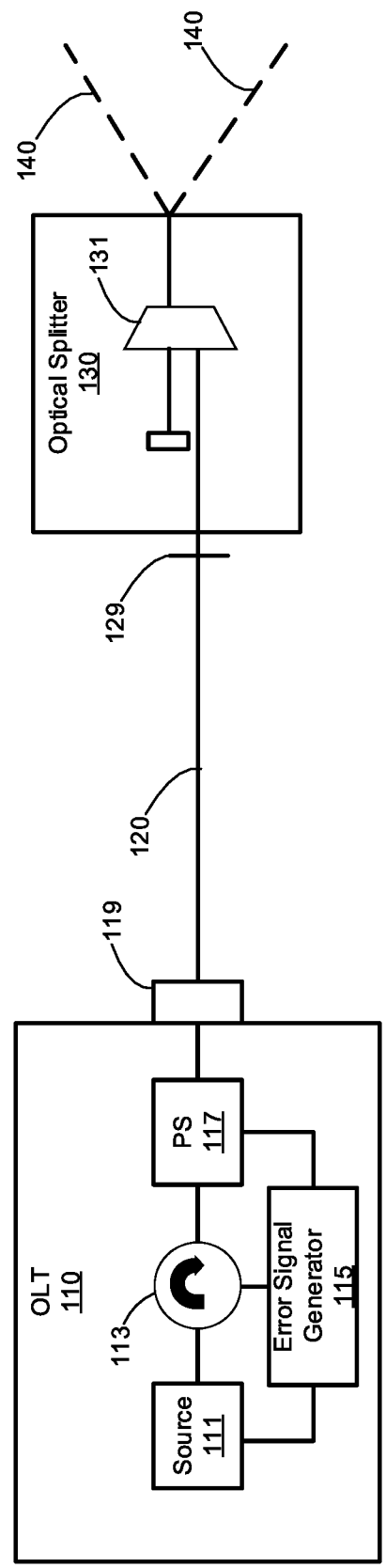
FIG. 2 is a schematic diagram illustrating an Optical Line Termination (OLT) and optical splitter of the optical network of FIG. 1.

The OLT 110 is shown in more detail in FIG. 2. The OLT 110 includes an optical source 111 (e.g. a laser) configured to generate a 1550 nm optical signal. This wavelength is within the C-band of optical telecommunications such that it experiences relatively low attenuation when transmitted over optical fiber (relative to the attenuation experienced by wavelengths outside the optical telecommunications bands). One or more ONUs of the plurality of ONUs 150 have specific requirements for the 1550 nm optical signal, such as a linewidth requirement and/or signal coherence time requirement.

The OLT 110 also includes a circulator 113, an error signal generator 115 and a phase shifter 117. The circulator 113, error signal generator 115 and phase shifter 117 participate in an Active Noise Cancellation (ANC) mechanism, described below.

The OLT 110 also includes an optical communications interface 119 with the spine fiber 120, enabling communication of the 1550 nm optical signal (generated by the optical source 111 of the OLT 110) to the optical splitter 130 via the spine fiber 120. The 1550 nm optical signal, when being transmitted from the optical source 111 towards the plurality of ONUs 150, is hereinafter known as the "downstream 1550 nm optical signal".

The optical splitter 130 is a 32-way optical splitter for splitting and distributing the downstream 1550 nm optical signal to the plurality of ONUs 150 (although other optical splitters, such as a 16-way optical splitter, may be used). The optical splitter 130 also reflects (via a passive reflection) a portion of the downstream 1550 nm optical signal (hereinafter, the "reflection of the downstream 1550 nm optical signal") back towards the OLT 110 along the spine fiber 120. The reflection of the downstream 1550 nm optical signal may be used by the OLT 110 in an ANC mechanism to cancel phase noise on the downstream 1550 nm optical signal and therefore contribute to the downstream 1550 nm optical signal satisfying the specific requirements of one or more ONUs of the plurality of ONUs 150 (such as a linewidth requirement and/or signal coherence time requirement).

The optical splitter 130 also comprises a multiplexer-demultiplexer 131 for multiplexing the downstream 1550 nm optical signal onto the plurality of distribution fibers 140 (this is described in more detail below).

A filter 129 is positioned on the spine fiber 120 between the OLT 110 and optical splitter 130.

Figure 3:
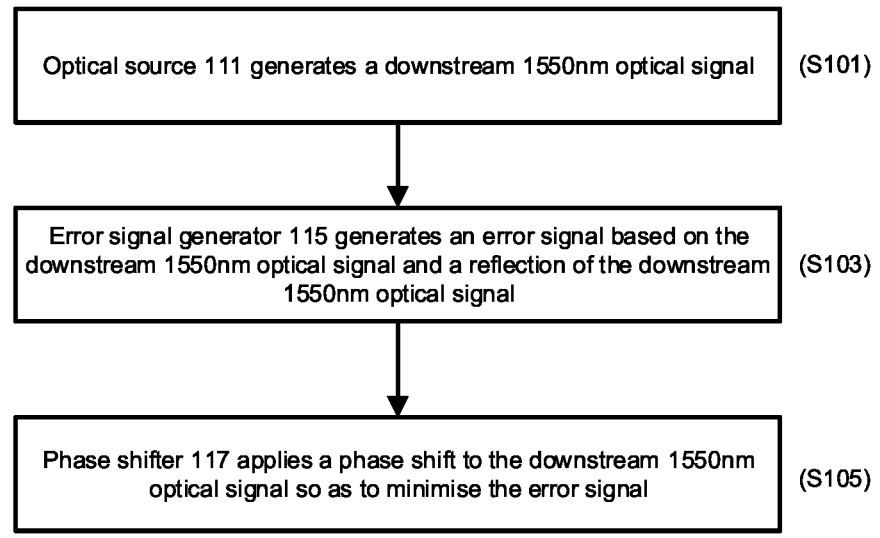
FIG. 3 is a flow diagram illustrating a first method.

The OLT 110 ANC mechanism will now be described with reference to the schematic diagram of the OLT 110 and optical splitter 130 in FIG. 2 and the flow diagram of FIG. 3. In S101 of FIG. 3, the optical source 111 generates the downstream 1550 nm optical signal. The downstream 1550 nm optical signal is transmitted in two paths—a first path to the circulator 113 (which passes the downstream 1550 nm optical signal to the phase shifter 117) and a second path to the error signal generator 115.

Following the first path of the downstream 1550 nm optical signal, the circulator 113 passes the downstream 1550 nm optical signal to the phase shifter 117. The phase shifter 117 is configured to apply a phase shift to the downstream 1550 nm optical signal so as to minimize an error signal generated by the error signal generator 115 (described in more detail below). The downstream 1550 nm optical signal, as phase shifted by the phase shifter 117, is then communicated via the optical communications interface 119 and spine fiber 120 to the optical splitter 130. As noted above, the optical splitter 130 reflects the downstream 1550 nm optical signal and the reflection of the downstream 1550 nm optical signal is received at the optical communications interface 119.

The reflection of the downstream 1550 nm optical signal is communicated from the optical communications interface 119 to the phase shifter 117 which applies a phase shift to the reflection of the downstream 1550 nm optical signal. The reflection of the downstream 1550 nm optical signal is then communicated to the circulator 113, which passes the reflection of the downstream 1550 nm optical signal to the error signal generator 115.

The error signal generator 115 therefore receives both the downstream 1550 nm optical signal from the optical source 111 (via the second path of the downstream 1550 nm optical signal which has not been phase shifted by the phase shifter 117) and the reflection of the downstream 1550 nm optical signal from the circulator 113 (which has been twice phase shifted by the phase shifter 117). In S103, the error signal generator 115 generates an error signal that is proportional to the interference between the downstream 1550 nm optical signal and the reflection of the downstream 1550 nm optical signal. The error signal generator 115 may generate this error signal by acting as a mixer that mixes the downstream 1550 nm optical signal and the reflection of the downstream 1550 nm optical signal, wherein the error signal produced from the mixing of these two optical signals is proportional to the interference between the two optical signals.

The error signal generator 115 communicates the generated error signal to the phase shifter 117. In S105, the phase shifter 117 applies a phase shift to the downstream 1550 nm optical signal so as to minimize the error signal. The phase shifter 117 includes a controller configured to control a value of the phase shift applied by the phase shifter 117 to the downstream 1550 nm optical signal. The controller therefore varies the phase shift applied to the downstream 1550 nm optical signal until the error signal is minimized (e.g. in a negative feedback loop) or at least reduced such that the downstream 1550 nm optical signal satisfies the requirement(s) of the one of more ONUs of the plurality of ONUs 150 (e.g. the linewidth of the downstream 1550 nm optical signal remains within the linewidth requirement and/or the signal coherence time of the downstream 1550 nm optical signal remains within the signal coherence time requirement).

The downstream 1550 nm optical signal is then communicated, via the optical communications interface 119 and spine fiber 120 to the optical splitter 130.

The above ANC mechanism is able to correct phase noise on the point-to-point link of the spine fiber 120 between the OLT 110 and optical splitter 130. However, this technique is not directly applicable to correct phase noise on a point-to-multipoint architecture such as the OLT 110 to plurality of ONU 150 architecture of FIG. 1. That is, the amount of phase noise experienced by a particular ONU of the plurality of ONUs 150 may differ from the phase noise experienced by another ONU of the plurality of ONUs 150 (due to, for example, the phase noise at each respective port of the optical splitter 130 imparting a different amount of phase noise and/or each respective distribution fiber 140 imparting a different amount of phase noise). Accordingly, a single phase shift cannot be applied by the OLT 110 to correct the different amounts of phase noise experienced by each ONU of the plurality of ONUs 150.

Figure 4:
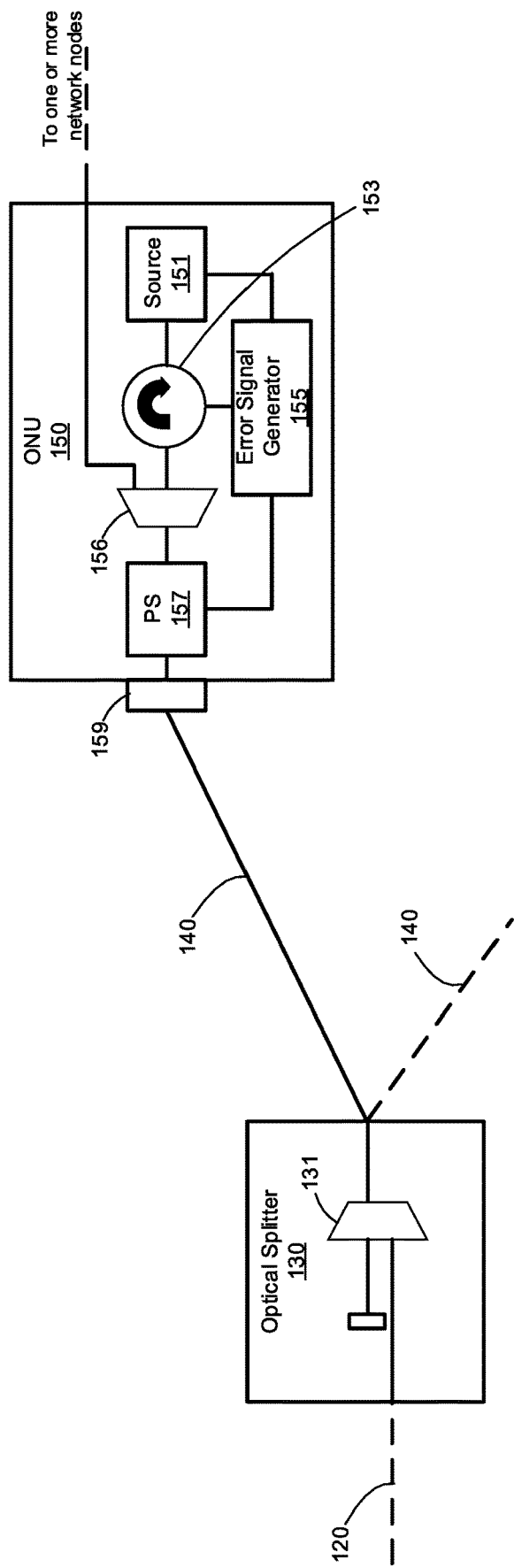
FIG. 4 is a schematic diagram illustrating the optical splitter and an Optical Network Unit (ONU) of the optical network of FIG. 1.

This problem is solved in the optical network 100 by implementing the ANC mechanism at each ONU 150 of the plurality of ONUs 150. The ONU 150 ANC mechanism will now be described with reference to the schematic diagram of an ONU 150 of the plurality of ONUs 150 and optical splitter 130 in FIG. 4 and the flow diagram of FIG. 5. The ONU 150 comprises an optical source 151 configured to generate a reference optical signal. The reference optical signal may have a different wavelength to the optical signal generated by the optical source 111 of the OLT 110. In an example, the reference optical signal has as wavelength of 1551 nm. The ONU 150 further comprises a circulator 153, an error signal generator 155, a multiplexer-demultiplexer 156 and a phase shifter 157. The circulator 153, error signal generator 155 and phase shifter 157 participate in an ANC mechanism, described below.

The ONU 150 also includes an optical communications interface 159 with its respective distribution fiber 140, enabling communication of the reference optical signal (generated by the optical source 151 of the ONU 150) to the optical splitter 130 via the respective distribution fiber 140. The reference optical signal, when being transmitted from the ONU 150 towards the optical splitter 130, is hereinafter known as the "upstream reference optical signal".

The optical splitter 130 reflects a portion of the upstream reference optical signal (hereinafter, the "reflection of the upstream reference optical signal") back towards the ONU 150 along the respective distribution fiber 140. The reflection of the upstream reference optical signal may be used by the ONU 150 in an ANC mechanism to cancel phase noise on the downstream 1550 nm optical signal and therefore contribute to the downstream 1550 nm optical signal satisfying the specific requirements of one or more ONUs of the plurality of ONUs 150 (such as a linewidth requirement and/or signal coherence time requirement).

As noted above, the optical splitter 130 also comprises a multiplexer-demultiplexer 131 which multiplexes the downstream 1550 nm optical signal (received from the OLT 110 from the spine fiber 120) onto the distribution fiber 140. The multiplexed downstream 1550 nm optical signal is communicated from the optical splitter 130 to the multiplexer-demultiplexer 156 of the ONU 150 via the distribution fiber 140, optical communications interface 159 and phase shifter 157. The phase shifter 157 applies a phase shift to the multiplexed downstream 1550 nm optical signal so as to minimize (or at least reduce) an error signal generated by the error signal generator 153, as described below.

Figure 5:
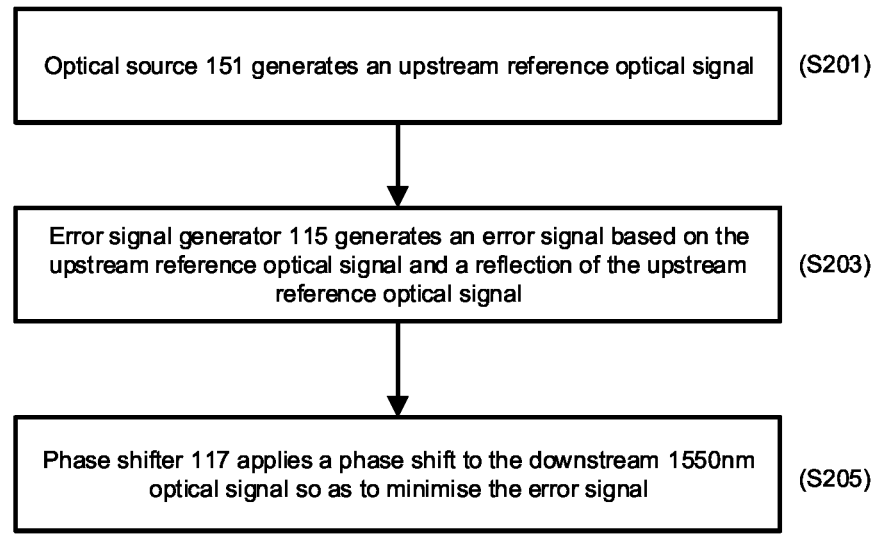
FIG. 5 is a flow diagram illustrating a second method.

In S201 of the flow diagram of FIG. 5, the optical source 151 generates the upstream reference optical signal. The upstream reference optical signal is transmitted in two paths—a first path to the circulator 153 (which passes the upstream reference optical signal to the multiplexer-demultiplexer 156) and a second path to the error signal generator 155.

Following the first path of the upstream reference optical signal, the circulator 153 passes the upstream reference optical signal to the multiplexer-demultiplexer 156. The multiplexer-demultiplexer 156 multiplexes the upstream reference optical signal with the downstream 1550 nm optical signal. The multiplexed upstream reference optical signal is communicated to the phase shifter 157.

The phase shifter 157 is configured to apply a phase shift to the multiplexed upstream reference optical signal and multiplexed downstream 1550 nm optical signal based on an error signal generated by the error signal generator 155 (described in more detail below). The multiplexed upstream reference optical signal, as phase shifted by the phase shifter 157, is then communicated via the optical communications interface 159 and distribution fiber 140 to the optical splitter 130.

At the optical splitter 130, the multiplexed upstream reference optical signal is demultiplexed at the multiplexer-demultiplexer 131. The upstream reference optical signal is then reflected at the optical splitter 130. The reflection of the upstream reference signal is then multiplexed by the multiplexer-demultiplexer 131 (together with the downstream 1550 nm optical signal) onto the distribution fiber 140 and received at the optical communications interface 159 of the ONU 150.

The demultiplexing of the upstream reference optical signal at the optical splitter 130 may be imperfect. To avoid any portion of the upstream reference optical signal being communicated along the spine fiber to the OLT 110, the filter 129 (as shown in FIGS. 1 and 2) acts to remove the upstream reference optical signal from the spine fiber 120.

Returning to FIGS. 4 and 5, the multiplexed reflection of the upstream reference optical signal and multiplexed downstream 1550 nm optical signal is then communicated from the optical communications interface 159 to the phase shifter 157 which applies a phase shift to the multiplexed upstream reference optical signal and multiplexed downstream 1550 nm optical signal based on an error signal generated by the error signal generator 155. It is noted that the downstream 1550 nm optical signal is phase shifted once by the phase shifter 157 but the reflection of the upstream reference signal is phase shifted twice (a first phase shift as it is communicated from the ONU 150 to the optical splitter 130 prior to reflection, and a second phase shift as it is communicated from the optical splitter 130 to the ONU 150 after reflection).

The multiplexer-demultiplexer 156 demultiplexes the downstream 1550 nm optical signal and the reflection of the upstream reference optical signal. Following the path of upstream reference optical signal, the reflection of the upstream reference optical signal is communicated to the circulator 153, which passes the reflection of the upstream reference optical signal to the error signal generator 155.

The error signal generator 155 therefore receives both the upstream reference optical signal from the optical source 151 (via the second path of the upstream reference optical signal which has not been phase shifted by the phase shifter 157) and the reflection of the upstream reference optical signal from the circulator 153 (which has been twice phase shifted by the phase shifter 157). In S203, the error signal generator 155 generates an error signal that is proportional to the interference between the upstream reference optical signal and the reflection of the upstream reference optical signal. The error signal generator 155 may generate this error signal by acting as a mixer that mixes the upstream reference optical signal and the reflection of the upstream reference optical signal, wherein the error signal produced from the mixing of these two optical signals is proportional to the interference between the two optical signals.

The error signal generator 155 communicates the generated error signal to the phase shifter 157. In S205, the phase shifter 157 applies a phase shift to both the multiplexed upstream reference optical signal and the multiplexed downstream 1550 nm optical signal so as to minimize the error signal. The phase shifter 157 includes a controller configured to control a value of the phase shift applied by the phase shifter 157 to the multiplexed upstream reference optical signal and the multiplexed downstream 1550 nm optical signal. The controller therefore varies the phase shift applied to the multiplexed upstream reference optical signal and the multiplexed downstream 1550 nm optical signal until the error signal generated by the error signal generator 155 is minimized (e.g. in a negative feedback loop) or at least reduced such that the downstream 1550 nm optical signal satisfies the requirement(s) of the one or more ONUs of the plurality of ONUs 150 (such as a linewidth requirement and/or signal coherence time requirement).

The multiplexed downstream 1550 nm optical signal is therefore communicated, with a corrected phase, to the multiplexer-demultiplexer 153. As noted above, the multiplexer-demultiplexer 153 demultiplexes the downstream 1550 nm optical signal and (optionally) communicates the downstream 1550 nm optical signal to one or more network nodes (not shown) downstream of the ONU 150.

The combination of the OLT ANC mechanism and the ONU ANC mechanism therefore enables the downstream 1550 nm optical signal to be generated by a single optical source 111 and distributed to the plurality of ONUs 150 (and any downstream network nodes) with cancelled phase noise so as to satisfy requirements for the downstream 1550 nm optical signal at the plurality of ONUs 150.

The first optical fiber network 100 therefore provides a point-to-multipoint architecture having ANC applied to the respective connection between the transmitter (the OLT 110) and each receiver (the ONU 150). As noted above, this is not possible when applying ANC at the OLT 110 alone to the downstream signal, but is achieved in the optical fiber network 100 by applying ANC at each ONU 150 to the downstream signal based on the analysis of an upstream signal. The first optical network 100 may therefore suffer less phase noise than conventional optical fiber networks, enabling the first optical network 100 to meet performance requirements such as a linewidth requirement and/or a signal coherence time requirement. The first optical network 100 may therefore be more useful in applications having relatively strict linewidth and/or signal coherence requirements, such as in Quantum Key Distribution (QKD), Rydberg-atom based technologies (such as a Rydberg-atom based electromagnetic field detector, a Rydberg-atom based atomic clock, etc.), and distributed massive MIMO (to provide phase coherence between physically separated antennas).

Figure 6:
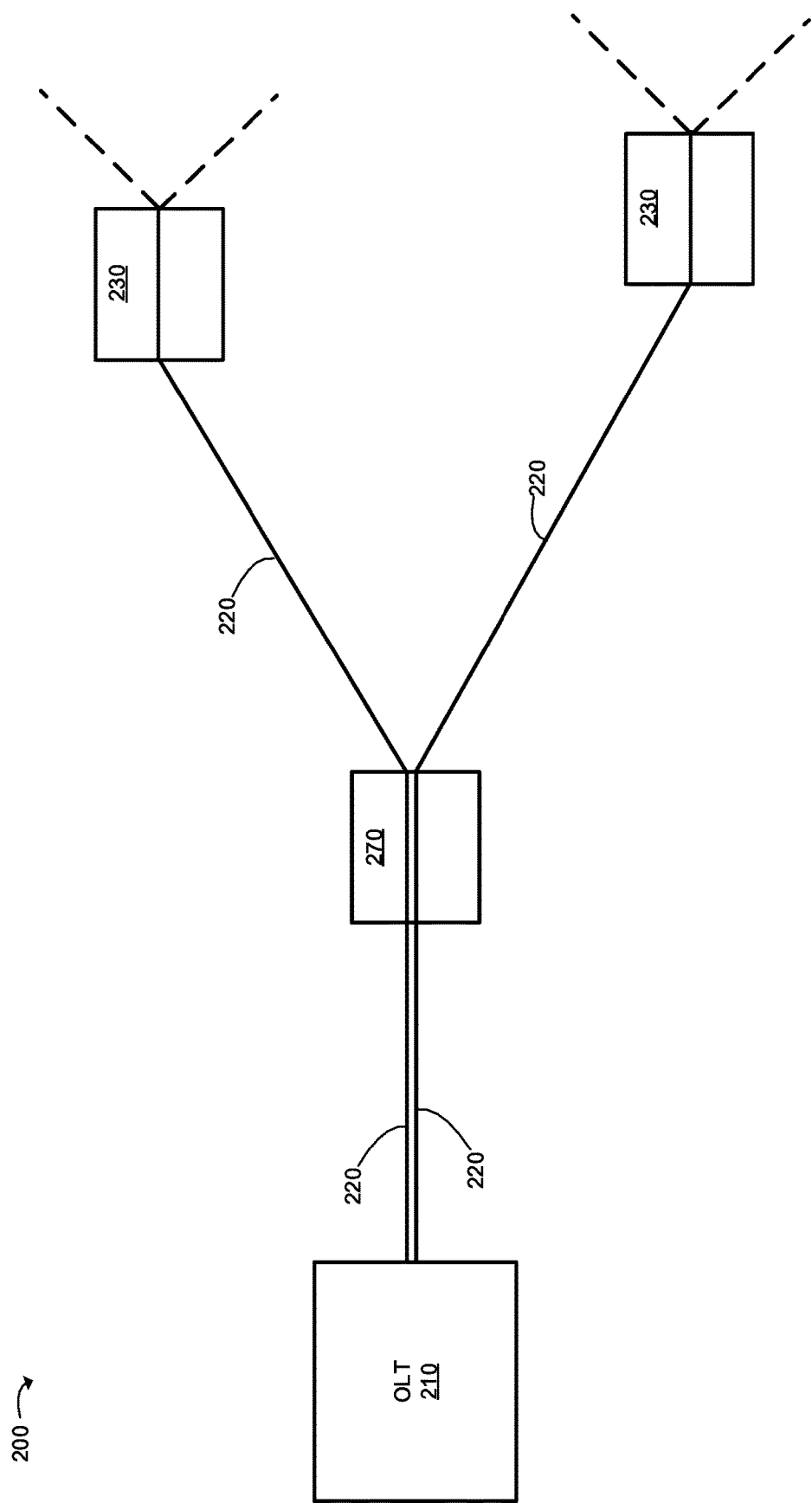
FIG. 6 is a schematic diagram illustrating a second optical network.

The first optical network 100 comprises a single optical splitter 130. However, as shown in the second optical network 200 in FIG. 6, the optical splitter may be one of a plurality of optical splitters 230, and the second optical network 200 may further comprise an aggregation node 270 between the OLT 210 and the plurality of optical splitters 230. In this scenario, the second optical network comprises a plurality of spine fibers 220, wherein each spine fiber connects the OLT 210 to a respective optical splitter of the plurality of optical splitters 230 via the aggregation node 270, and the OLT 210 generates a distinct optical signal for each spine fiber. The OLT ANC mechanism is then performed independently to each spine fiber based on the reflection of the distinct optical signal by the respective optical splitter (as described above in relation to the single optical splitter scenario).

Figure 7:
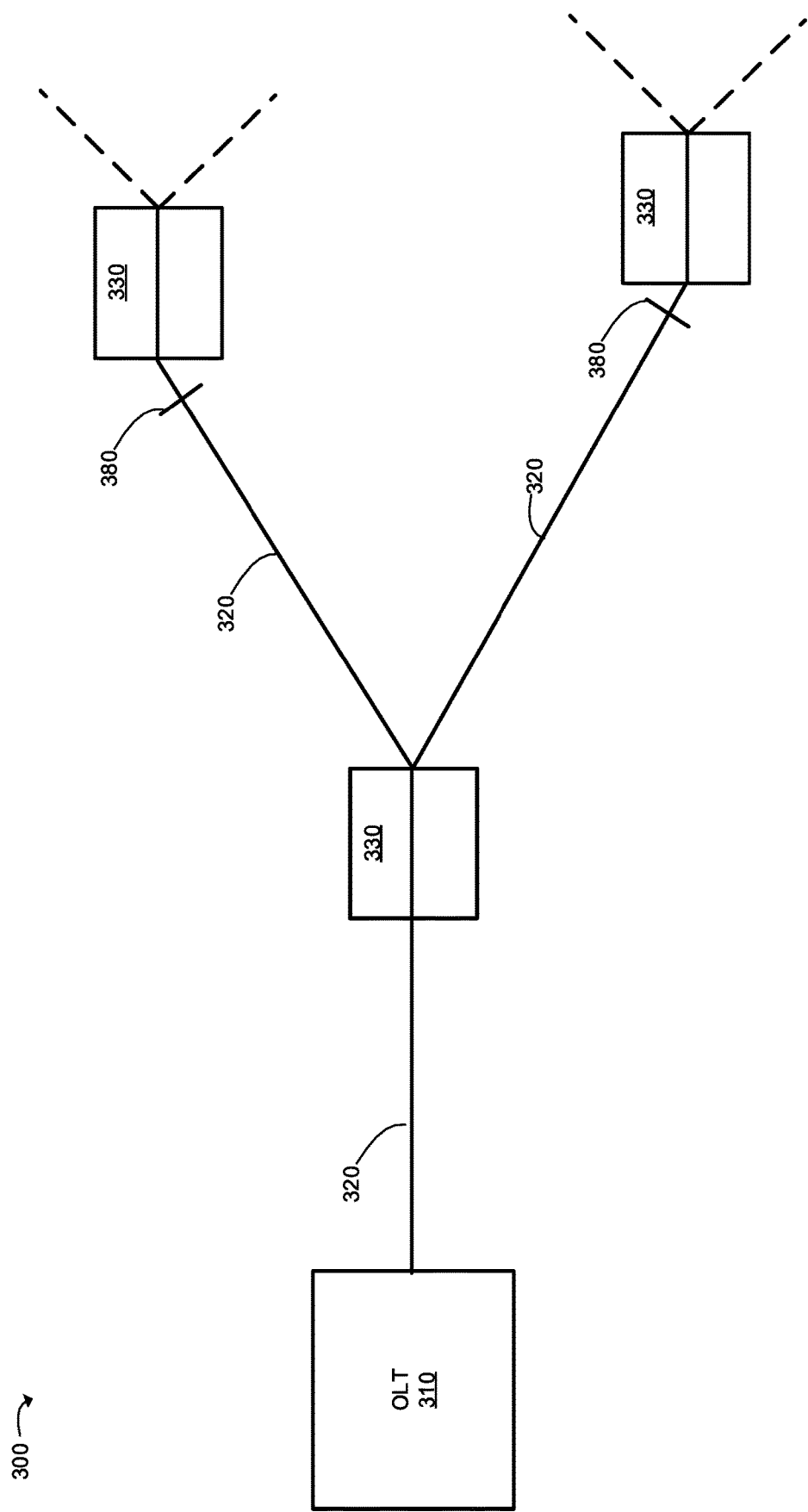
FIG. 7 is a schematic diagram illustrating a third optical network.

A third optical network 300 is shown in FIG. 7, the third optical network 300 also comprising a plurality of optical splitters 330. In the third optical network 300, the plurality of optical splitters 330 are arranged in a hierarchy so the OLT 310 connects to each ONU of the plurality of ONUs by a series of optical splitters. In this scenario, the OLT 310 may utilize wavelength division multiplexing to multiplex a plurality of optical signals for communication with the plurality of ONUs. Each downstream optical signal of the plurality of optical signals has a wavelength dedicated to a (disjoint) set of the plurality of ONUs, wherein the (disjoint) set of the plurality of ONUs are all directly connected to a particular last-hop optical splitter of the plurality of optical splitters 330. A fiber Bragg grating 380 may be positioned at each last-hop optical splitter so as to reflect the downstream optical signal at the wavelength dedicated to the (disjoint) set of the plurality of ONUs connected to that last-hop optical splitter. The OLT 310 may therefore implement the above OLT ANC mechanism to the downstream optical signal from the OLT 110 to each last-hop optical splitter by demultiplexing the reflection of the downstream optical signal at the wavelength dedicated to that respective (disjoint) set of the plurality of ONUs and using it to generate an error signal (as described above). This scenario may be relevant when different (disjoint) sets of the plurality of ONUs require optical signals at different wavelengths and those sets of the plurality of ONUs are connected to separate last-hop optical splitters in a concatenated optical splitter architecture.

The optical networks described above utilize an upstream reference signal that may have a wavelength of 1551 nm. The difference between the wavelength of the upstream reference signal and the wavelength of the downstream signal is within a threshold such that the phase noise imparted to the upstream reference signal as it is communicated over the distribution fiber is the same as or substantially the same as the phase noise imparted to the downstream signal as it is communicated over the distribution fiber. This threshold may be, for example, 0.1%, 1%, 5% or 10%. The threshold may be determined by a calibration phase in which the phase noise (and/or one or more requirements related to phase noise) at one or more ONUs is measured when using upstream reference signals at different wavelengths, and identifying the wavelengths for the upstream reference signal that enable the ONU ANC mechanism to satisfactorily correct the phase noise (and/or satisfy the one or more requirements related to phase noise). The acceptable level of phase noise (and/or the one or more requirements) may differ for different applications, so these identified wavelengths for the upstream reference signal may be application-specific.

It is also non-essential that the upstream reference signal and downstream signal use different wavelengths. That is, the downstream signal and upstream reference signal may have the same wavelength and are time-multiplexed onto the optical fibers. It is also non-essential that one or both of the downstream and upstream optical signals are within the C-band of optical telecommunications. One or both of the downstream and upstream optical signals may be within any one of the communication bands of optical telecommunications, or outside these communication bands.

In the above first optical network 100, the error signal was generated in both the OLT ANC mechanism and the ONU ANC mechanism by mixing two optical signals. The error signal generators may be improved by applying a known constant frequency offset to one of the signals (that is, one of the downstream 1550 nm optical signal or reflection of the downstream 1550 nm optical signal in the OLT ANC mechanism, or one of the upstream reference optical signal or reflection of the upstream reference optical signal in the ONU ANC mechanism) prior to mixing. The frequency offset signal may be generated by a Radio Frequency (RF) signal generator. Mixing the shifted and unshifted optical signals produces a resulting beat note (centered at the frequency offset). The frequency offset may then be removed to derive the error signal that may then be used by the phase shifter. This technique may improve the accuracy of the error signal.

In the optical networks described above, the ONU ANC mechanism was applied by modules present in the ONU. However, this is non-essential and one or more separate nodes may cooperate with each ONU to implement the ONU ANC mechanism.

The skilled person will also understand that the OLT ANC mechanism is non-essential, such as when the spine fiber has optical transmission characteristics (such as a sufficiently short length) such that the one or more requirements of the one or more ONUs of the plurality of ONUs are satisfied without the OLT ANC mechanism.

In the optical networks described above, the phase shifters apply a phase shift to the respective optical signals to minimize (or at least reduce) the phase noise using a negative feedback loop based on an error signal. The skilled person will understand that the use of a negative feedback loop is non-essential and other techniques for reducing the phase noise based on the generated optical signal and its reflection may be used (such as a calibrated table between the error signal and a corresponding phase shift).

The optical networks described above are Passive Optical Networks (PONs). However, the skilled person will understand that the methods described above apply to any form of point-to-multipoint optical network.

FIG. 8 illustrates a method in an optical network, the optical network comprising the optical network comprising: a first optical transmitter; an optical splitter; a plurality of optical receivers; a first optical fiber connecting the first optical transmitter and the optical splitter; a plurality of second optical fibers, each second optical fiber connecting the optical splitter to a respective optical receiver of the plurality of optical receivers, wherein the first optical transmitter is configured to transmit a first optical signal to each optical receiver of the plurality of optical receivers via the first optical fiber, the optical splitter and a respective second optical fiber of the plurality of second optical fibers; and a plurality of second optical fiber phase correction units, each second optical fiber phase correction unit being associated with a second optical fiber of the plurality of second optical fibers, the method comprising: transmitting (S301) a reference optical signal on the associated second optical fiber of the plurality of second optical fibers; generating (S303) a reference error signal based on a reflection of the reference optical signal on the associated second optical fiber of the plurality of second optical fibers; and applying (S305) a phase shift to the first optical signal based on the reference error signal.

The skilled person will understand that any combination of features is possible within the scope of the disclosure, as claimed.

The invention claimed is:
1. An optical network comprising:
a first optical transmitter;
an optical splitter;
a plurality of optical receivers;
a first optical fiber connecting the first optical transmitter and the optical splitter;
a plurality of second optical fibers, each second optical fiber of the plurality of second optical fibers connecting the optical splitter to a respective optical receiver of the plurality of optical receivers, wherein the first optical transmitter is configured to transmit a first optical signal to each optical receiver of the plurality of optical receivers via the first optical fiber, the optical splitter and a respective second optical fiber of the plurality of second optical fibers; and
a plurality of second optical fiber phase correction units, each second optical fiber phase correction unit of the plurality of second optical fiber phase correction units being associated with a second optical fiber of the plurality of second optical fibers, each second optical fiber phase correction unit comprising a reference optical transmitter, a reference error signal generator and a reference phase shifter, wherein:
each reference optical transmitter is configured to transmit a reference optical signal on the associated second optical fiber of the plurality of second optical fibers, each reference error signal generator is configured to generate a reference error signal based on a reflection of the reference optical signal on the associated second optical fiber of the plurality of second optical fibers, and each reference phase shifter is configured to apply a phase shift to the first optical signal based on the reference error signal.

2. The optical network as claimed in claim 1, wherein each optical receiver of the plurality of optical receivers comprises the associated second optical fiber phase correction unit of the plurality of second optical fiber phase correction units.

3. The optical network as claimed in claim 1, wherein the reference optical signal is reflected by the optical splitter so as to generate the reflection of the reference optical signal.

4. The optical network as claimed in claim 1, wherein the first optical signal is transmitted in a downstream direction and the reference optical signal is transmitted in an upstream direction.

5. The optical network as claimed in claim 1, further comprising:

a first optical fiber phase correction unit associated with the first optical fiber, the first optical fiber phase correction unit comprising a first error signal generator and a first phase shifter, wherein:

the first error signal generator is configured to generate a first error signal based on a reflection of the first optical signal on the first optical fiber, and the first phase shifter is configured to apply a phase shift to the first optical signal based on the first error signal.

6. The optical network as claimed in claim 1, wherein:

the first optical transmitter is configured to transmit the first optical signal at a first wavelength to each optical receiver of the plurality of optical receivers via the first optical fiber, the optical splitter and the respective second optical fiber of the plurality of second optical fibers, and the reference optical transmitter is configured to transmit the reference optical signal at a second wavelength on the associated second optical fiber of the plurality of second optical fibers, wherein the first wavelength is different from the second wavelength.

7. The optical network as claimed in claim 1, wherein the optical splitter is a first hop optical splitter of a plurality of optical splitters, the plurality of optical splitters further comprises a first last-hop optical splitter and a second last-hop optical splitter, a first set of the plurality of optical receivers is connected to the first last-hop optical splitter, a second set of the plurality of optical receivers is connected to the second last-hop optical splitter, the first optical signal comprises data for the first set of the plurality of optical receivers and is transmitted at a first wavelength using wavelength-division-multiplexing via the first-hop optical splitter and the first last-hop optical splitter, and the first optical transmitter is further configured to transmit a second optical signal at a second wavelength using wavelength-division-multiplexing via the first-hop optical splitter and the second last-hop optical splitter, the second optical signal comprising data for the second set of the plurality of optical receivers, the optical network further comprising:

a first wavelength-selective reflector associated with the first last-hop optical splitter and configured to reflect the first optical signal at the first wavelength;

a second wavelength-selective reflector associated with the second last-hop optical splitter and configured to reflect the second optical signal at the second wavelength; and a first optical fiber phase correction unit associated with the first optical fiber, the first optical fiber phase correction unit comprising a first error signal generator, a first phase shifter, a second error signal generator and a second phase shifter, wherein:

the first error signal generator is configured to generate a first error signal based on a reflection of the first optical signal at the first wavelength on the first optical fiber, the first phase shifter is configured to apply a phase shift to the first optical signal at the first wavelength based on the first error signal, the second error signal generator is configured to generate a second error signal based on a reflection of the second optical signal at the second wavelength on the first optical fiber, and the second phase shifter is configured to apply a phase shift to the second optical signal at the second wavelength based on the second error signal.

8. A method in an optical network, the optical network comprising a first optical transmitter; an optical splitter; a plurality of optical receivers; a first optical fiber connecting the first optical transmitter and the optical splitter; a plurality of second optical fibers, each second optical fiber connecting the optical splitter to a respective optical receiver of the plurality of optical receivers, wherein the first optical transmitter is configured to transmit a first optical signal to each optical receiver of the plurality of optical receivers via the first optical fiber, the optical splitter and a respective second optical fiber of the plurality of second optical fibers; and a plurality of second optical fiber phase correction units, each second optical fiber phase correction unit being associated with a second optical fiber of the plurality of second optical fibers, the method comprising:

transmitting a reference optical signal on the associated second optical fiber of the plurality of second optical fibers;

generating a reference error signal based on a reflection of the reference optical signal on the associated second optical fiber of the plurality of second optical fibers; and applying a phase shift to the first optical signal based on the reference error signal.

9. A non-transitory computer-readable storage medium storing a computer program comprising instructions which, when the computer program is executed by a computer, cause the computer to carry out the method of claim 8.

10. A system comprising:

at least one processor and memory storing a computer program which, when executed by the system, causes the system to carry out the method of claim 8.

* * * * *